United States Patent
Rahn

[15] 3,679,922
[45] July 25, 1972

[54] HOUSING ARRANGEMENT FOR AN APPARATUS TRANSFORMING ROTARY SPEED INTO ELECTRIC SIGNALS

[72] Inventor: Horst Rahn, Villingen, Germany
[73] Assignee: Kienzle Apparate GmbH, Villingen/Scharzwald, Germany
[22] Filed: April 6, 1971
[21] Appl. No.: 131,739

[30] Foreign Application Priority Data

April 7, 1970 Germany..................G 70 12 543.8

[52] U.S. Cl..................................310/89, 310/71
[51] Int. Cl..................................H02k 5/00
[58] Field of Search..............310/89, 91, 85, 88, 96, 99, 310/66, 47, 71, 50, 168–170

[56] References Cited

UNITED STATES PATENTS

| | | | |
|---|---|---|---|
| 3,328,614 | 6/1967 | Falge | 310/168 |
| 3,561,835 | 2/1971 | Fyfe | 310/96 |
| 3,198,973 | 8/1965 | Short | 310/168 |
| 3,509,395 | 4/1970 | Schrecongost | 310/168 |
| 2,100,799 | 11/1937 | Drysdale | 310/66 |

Primary Examiner—J. D. Miller
Assistant Examiner—R. Skudy
Attorney—Michael S. Striker

[57] ABSTRACT

The housing of an apparatus transforming the rotary speed of the motor shaft of a motorcar into electric signals is constructed divisible and shaped to permit easy attachment to the gear casing of the motorcar.

A housing envelopes an adapter transmission and an electromechanical transducer, and has a tapered end formed by converging walls tangential to a connector tube projecting from the housing. The tapered housing end fits into a confined space on a transmission casing when the connector tube is attached to an other connecting tube projecting from the transmission casing so that a coupling in the connector tube connects the transmission in the casing with the adapter transmission in the housing.

9 Claims, 6 Drawing Figures

PATENTED JUL 25 1972
3,679,922
SHEET 1 OF 2
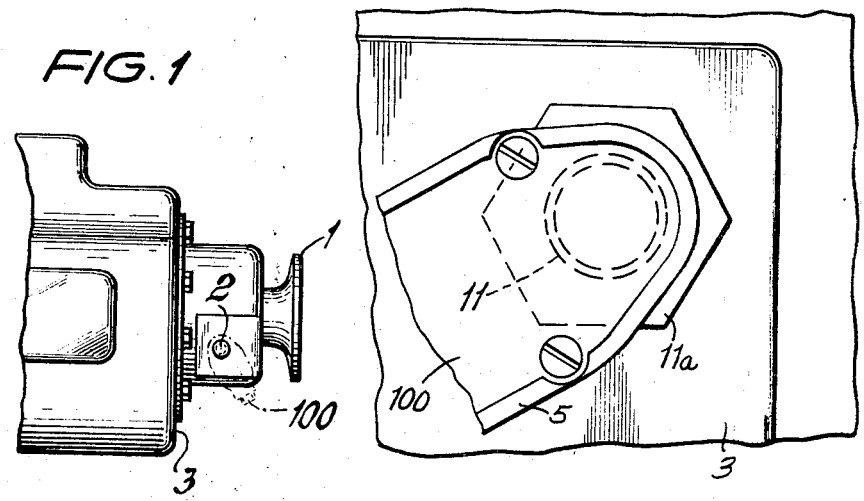
FIG. 1
FIG. 3a
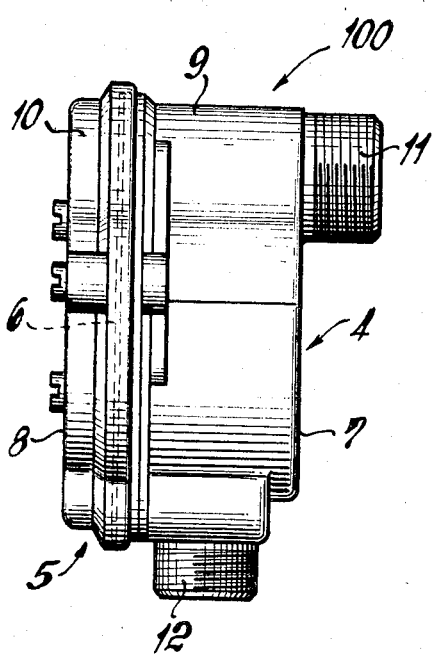
FIG. 2
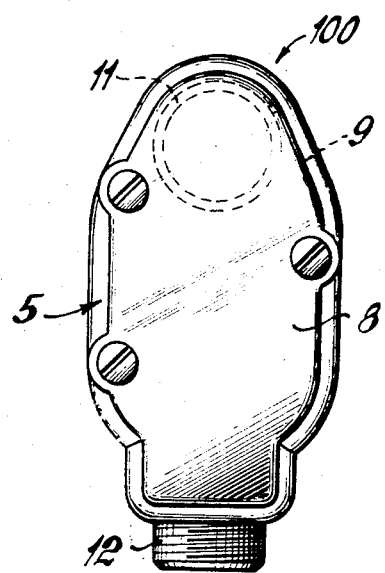
FIG. 3
INVENTOR
HORST RAHN

INVENTOR
HORST RAHN

Attorney 3,679,922

HOUSING ARRANGEMENT FOR AN APPARATUS TRANSFORMING ROTARY SPEED INTO ELECTRIC SIGNALS

BACKGROUND OF THE INVENTION

The present invention relates to a transmitter for devices which measure distance travelled, and speed of a motorcar. Apparatus of this type includes a transmission for adapting the rotary speed of the motor shaft to the respective measuring device which indicates the travelled distance, and an electromechanical transducer for generating an electric signal proportional to the rotary speed of the motor shaft.

Speedometers and odometers are usually combined in a single measuring device, and indicate or record the travelled distance and the varying speed of a motorcar. In taximeters, which indicate the fare depending on the travelled distance, it is also required to supply the number of revolutions of a wheel of a car to measuring and indicating devices. The drive of the measuring devices is taken from the output shaft of the transmission of the motorcar, and transmitted by a flexible shaft. The number of revolutions per minute of the wheel of the car, is different according to the type of vehicle, so that it is impossible to determine the transmission ratios in the measuring devices in accordance with the types of motorcars in which they are used, particularly since the number of revolutions depends on the tire of the wheel. It is therefore conventional, to determine a constant factor, for example one revolution per meter as rotary input speed, and to adapt the rotary speed which is to be measured by means of an adapter transmission to the respective constant factor.

The same is true for measuring and counting apparatus in which the measured value is represented by an electric signal, which is the preferred construction since flexible shafts cause considerable difficulties at low temperatures, and when a tight curvature is required.

In electric measuring devices it is also necessary to adapt the impulses generated by the transmitter per distance unit, to a constant of the apparatus, in order to avoid the construction of a very great number of different measuring devices. This means that the electromechanical transducer which serves the purpose to transform the rotary speed of a part of the car into a sequence of pulses proportional to the rotary speed, must be used together with an adapter transmission whose transmission ratio can easily be varied for adapting the electromechanical transducer to different types of vehicles.

In order to adjust the adapter transmission, to service the same, or to exchange a damaged part, it must be assured that the housing of the transducer and adapter transmission will be easily accessible when attached to the gear casing of the motorcar. Particularly, easy access to the adapter transmission is necessary, and it is desirable that the housing of the transmitter apparatus need not be detached from the motor casing or gear casing to which it is normally secured.

However, in apparatus of the prior art access to, or detachment of the housing of the transmitter apparatus is very difficult, and in many cases intermediate connecting pieces between the transmitter housing and the gear casing has to be provided.

In some cases additional supports, and an intermediate shaft for connecting the transmitter apparatus with the motor shaft of the car are required by the prior art. An awkward structure results which projects undesirably from the gear casing of the motorcar.

SUMMARY OF THE INVENTION

It is one object of the invention to provide a housing for a transmitter apparatus, including an adapter transmission and an electromechanical transducer, which can be directly attached to the gear casing of a vehicle, and which permits free access for servicing and for adjustment of the transmission ratio of the adapter transmission.

In accordance with the invention, the housing has two parts, whose plane of division substantially coincides with the plane in which the adapter transmission is located. The end walls of the housing are parallel, and at least one of the end walls has a threaded connector tube, whose axis is preferably perpendicular to the plane of division, while portions of the lateral walls of the housing are located in tangential planes tangential to an imaginary extension of the connector tube into the housing.

One embodiment of the invention comprises a supporting casing, such as a gear casing of a motorcar, a shaft rotatably mounted in the casing; and a housing including first and second housing parts abutting each other in a dividing plane, and having first and second end walls substantially parallel with the dividing plane.

The first housing part has a connector tube projecting from the first end wall for attachment to the supporting casing, and at least the first housing part has an endless lateral wall adjacent the first end wall and having wall portions disposed in planes tangential to the connector tube. In this manner, attachment of the housing to the gear casing is facilitated.

An adapter transmission, whose ratio can be adjusted, is located in the cavity, and is driven through a coupling means in the connector tube which is coupled with the shaft. An electromechanical transducer is located in the cavity and is driven by the transmission to generate electric signals representing the rotary speed of the shaft at a ratio depending on the adapter transmission.

In one embodiment, the housing has an intermediate partitioning wall forming first and second cavities with the first and second housing parts. The electromechanical transducer, and the adapter transmission are both mounted on the partitioning wall and respectively located in the first and second cavities on opposite sides of the partitioning wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary view illustrating the gear casing of a motorcar to which the apparatus of the invention may be attached;

FIG. 2 is a side view illustrating an embodiment of the invention;

FIG. 3 is a front view illustrating the embodiment of FIG. 2;

FIG. 3a is a detailed fragmentary view of the embodiment of FIG. 3;

DESCRIPTION OF THE PREFERRED EMBODIMENTS

Figure 5:
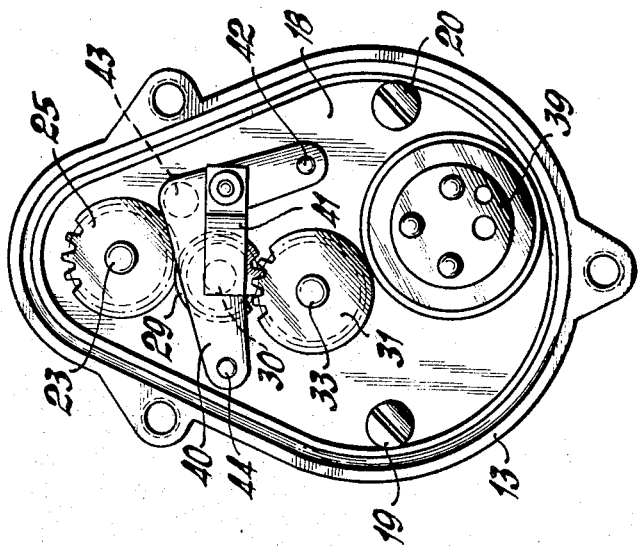
FIG. 5 is a front view of the embodiment of FIG. 4, a housing part being omitted.

Referring first to FIG. 1, the gear casing of a truck has an output flange 1, and a threaded connector tube 2 near the output 1 and projecting from the gear casing. An apparatus 100, which will be described with reference to FIGS. 2 and 3, is attached to the connector tube 2 by a connector portion 11, and is located in the confined space between the output flange 1 and the front wall 3 of the gear casing. In some constructions, the connector tube 2 is not only obstructed by the front wall 3, but also by other parts of the gear casing, which makes the mounting of transmitter housings according to the prior art difficult without the use of intermediate angular mounting members.

FIGS. 2 and 3 show a housing according to the invention including a first housing part 4 and a second housing part 5, constructed as a flat lid, the housing parts 4 and 5 abutting in a dividing plane 6.

The end walls 7 and 8 are bounded by endless lateral walls 9 and 10, respectively, and a threaded connector tube 11 projects from the end wall 11 of housing part 4 in a direction perpendicular to the dividing plane 6.

As shown in FIG. 1, the connector tubes 11 and 2 register and can be threadedly connected, so that the apparatus 100 is detachably attached to the gear casing by means of a nut 11a shown in FIG. 3a.

Particularly FIG. 3 shows that portions of the lateral endless wall 9 converge and extend tangentially to the tubular connector 11 so that the respective end portion of the housing is tapered, and takes up very little space beyond the diameter of the connector tube 11 so that sufficient space is available in the confined space formed by the gear casing for the mounting of the apparatus 100.

Housing part 4, and more particularly a portion of the lateral endless wall 9 at the other housing end portion, is provided with another tubular connector 12, which is either provided with a thread, or with a bayonet joint, and which is constructed to serve as an electric coupling to which a cable may be attached for transmitting electric signals generated in the housing to measuring and indicating devices.

A modification of the housings shown in FIGS. 2 and 3 is possible in which the lid 5 is constructed with a rim which overlaps the rim of housing part 4, so that a labyrinth seal is formed which protects the interior of the housing from splashed water.

Figure 4:
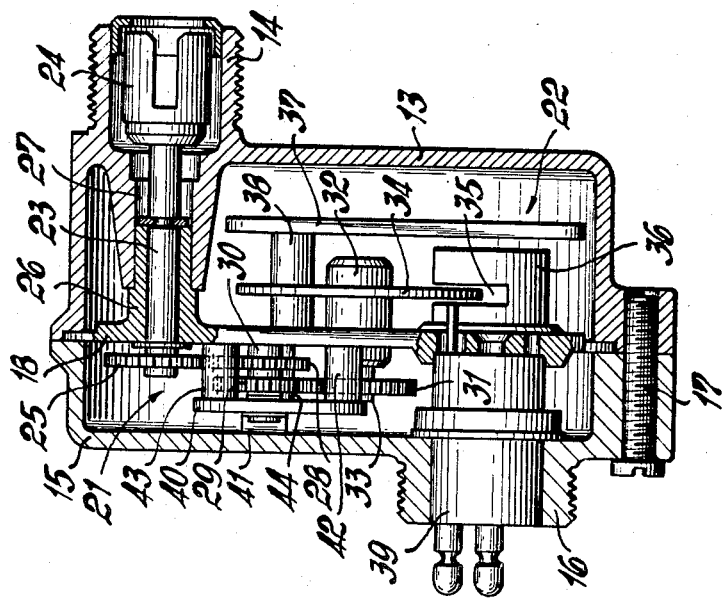
FIG. 4 is a sectional view illustrating another embodiment of the invention.

Another embodiment of the invention is illustrated in FIGS. 4 and 5. The rim of the housing part 13 abuts a corresponding rim of a housing part 15 along a dividing plane. Housing part 13 has an end wall from which a connecting tube 14 projects in which a coupling means 24 is located in a position for being coupled with a shaft in the gear casing shown in FIG. 1. The respective housing end portion tapers as described with reference to FIG. 3, to fit into the confined space at the transmission casing 3. The end wall of the other housing part 15, which forms the cover, has another connector tube 16 in which a plug member 39 is located for establishing electric connections. Three screws 17, of which only one is shown in FIG. 4 secure the housing parts 13 and 15 to each other.

An intermediate partitioning wall 18 located substantially in the dividing plane between the cavities in housing parts 13 and 15, supports the adapter transmission 21 in the cavity of the housing part 15, and the electromechanical transducer 22 in the cavity of the housing part 13.

Adapter transmission 21 is driven by a shaft 23 which has coupling member 24 at one end, and the gear 25 at the other end. Shaft 23 is mounted in a bearing 26 secured to partitioning wall 18, and is centered by a tubular inner projection 27 of the end wall of housing part 13.

The input gear 25 of the adapter transmission 21, meshes with a gear 28 which is mounted on a shaft 30 together with another gear 29. Gear 29 meshes with a gear 31 which is secured to a shaft 33 rotatably mounted in a bearing bushing 32 which is secured to partitioning wall 18. Shaft 33 further carries a fixed disc 34 with a toothed periphery whose peripheral portion projects into a slot 35 in an insulating body 36 secured to the partitioning wall 18. Insulating body 36 contains oscillator coils, not shown, which cooperate with the toothed disc 34. A mounting plate 37 which is secured by a pin 38 to the partitioning wall 18 carries the other electrical components of the electrical mechanical transducer 22. The pulses produced in the oscillator coils, not shown, are supplied by the plug member 39 to electric measuring means, not shown, which indicate the respective travelled distance, or the rotary speed of the shaft of the motorcar. One end of shaft 30 is free, and is supported for rotation by a bearing plate 40 which is urged by a leave spring secured thereto against the pins 42, 43 and 44 when the housing part 15 is attached to the housing part 13. When housing part 15 is removed, the gear on shaft 30 can be exchanged for varying the transmission ratio.

The embodiment of FIGS. 4 and 5 has the advantage that, when an adjustment of the transmission ratio of the adapter transmission 21 is necessary, the electrical parts of the electromechanical transducer 22 are protected by the partitioning wall, while the adapter transmission 21 is exposed. Consequently, the electrical component cannot be damaged or soiled by lubricating substances, and due to the provision of the loosely mounted bearing member 40, only a limited use of tools is necessary.

It will be understood that each of the elements described above, or two or more together, may also find a useful application in other types of housing arrangements for apparatus transforming rotary speeds into electric signals differing from the types described above.

While the invention has been illustrated and described as embodied in a housing divided into a first cavity containing electric components, and a second cavity containing an adapter transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Mounting arrangement for an apparatus transforming rotary speed into electric signals, comprising a supporting casing having wall means forming a confined space and including a first connector tube in said confined space; transmission means including an output shaft and being mounted in said casing for driving said output shaft at varying speeds; a housing having a housing end portion including a second connector tube perpendicularly projecting from said housing and being detachably connected with said first connector tube for supporting at least said housing end portion in said confined space, said housing end portion converging toward the respective end of said housing and including two lateral converging wall portions disposed in planes tangential to said second connector tube on opposite sides of said second connector tube, and a curved wall end portion substantially matching the contour of said second connector tube and connecting said lateral converging wall portions with each other, said housing including a third connector tube; and an adapter transmission in said housing including an input shaft having coupling means located in said second connector tube for being coupled with said transmission means in said casing through said first connector tube; and an electro mechanical transducer in said housing driven by said adapter transmission and generating electric signals representing the rotary speed of said output shaft at a ratio depending on said adapter transmission, and including electric output means located in said third connector tube.

2. Arrangement as claimed in claim 1 wherein said housing includes first and second housing parts abutting each other in a dividing plane and including first and second walls substantially parallel to said dividing plane, said first wall supporting said second connector tube in a position perpendicular to said first wall, one of said housing parts having an endless lateral wall including said lateral converging wall portions.

3. Arrangement as claimed in claim 2 wherein said third connector tube projects at an other housing end portion from said lateral wall in a direction transverse to said second connector tube.

4. Arrangement as claimed in claim 2 wherein said third connector tube perpendicularly projects from said second wall at an other housing end portion.

5. Arrangement as claimed in claim 2 wherein said housing includes a partitioning wall forming first and second cavities with said first and second housing parts; wherein said transducer is located in said first cavity; wherein said adapter transmission is located in said second cavity and includes means passing through said partitioning wall for driving said transducer; and wherein said housing includes means mounting said transducer and said adapter transmission on said partitioning wall.

6. Housing arrangement as claimed in claim 2 wherein said second housing part is a flat cover.

7. Housing arrangement as claimed in claim 5 wherein said partitioning wall is substantially located in said dividing plane.

partitioning Housing arrangement for an apparatus transforming rotary speed into electric signals, comprising a supporting casing; a shaft rotatably mounted in said casing; and a housing including first and second housing parts abutting each other in a dividing plane, and having first and second end walls substantially parallel with said dividing plane, said first housing part having a connector tube projecting from said first end wall for attachment to said supporting casing, at least said first housing part having an endless lateral wall adjacent said first end wall and having wall portions disposed in planes tangential to said connector tube so as to facilitate attachment of said housing to said casing, said housing including a partitioning wall forming first and second cavities with said first and second housing parts; an electromechanical transducer in said first cavity; an adapter transmission in said second cavity for driving said electromechanical transducer; coupling means in said connector means coupled with said shafts and connected with said transmission; said adapter transmission and said electromechanical transducer being mounted on said partitioning wall, said adapter transmission including at least one transmission shaft mounted at one end in said partitioning wall and having an other free end; a bearing member located within said second cavity and supporting said free shaft end; and resilient means between said second end wall and said bearing member.

9. Housing arrangement as claimed in claim 8 wherein said resilient means includes a leaf spring mounted on said second housing part abutting said bearing member.

* * * * *